May 24, 1966  P. WOLLNER ETAL  3,252,655
TEMPERATURE CONTROL SYSTEMS
Original Filed June 27, 1960  2 Sheets-Sheet 1

INVENTOR.
PAUL WOLLNER
RICHARD H. WALTER, JR.
BY Clark + Ott
ATTORNEYS

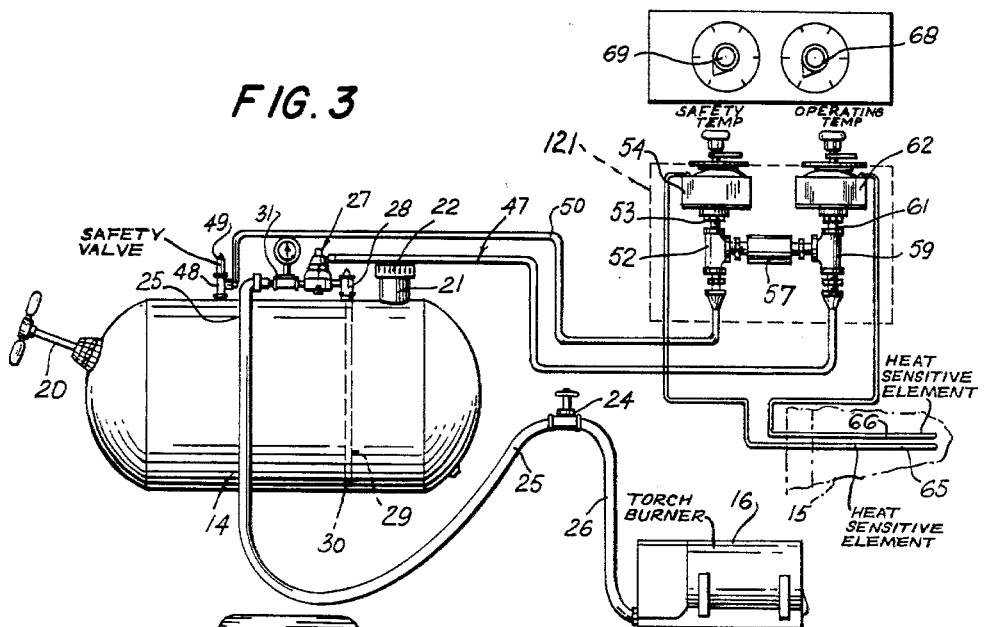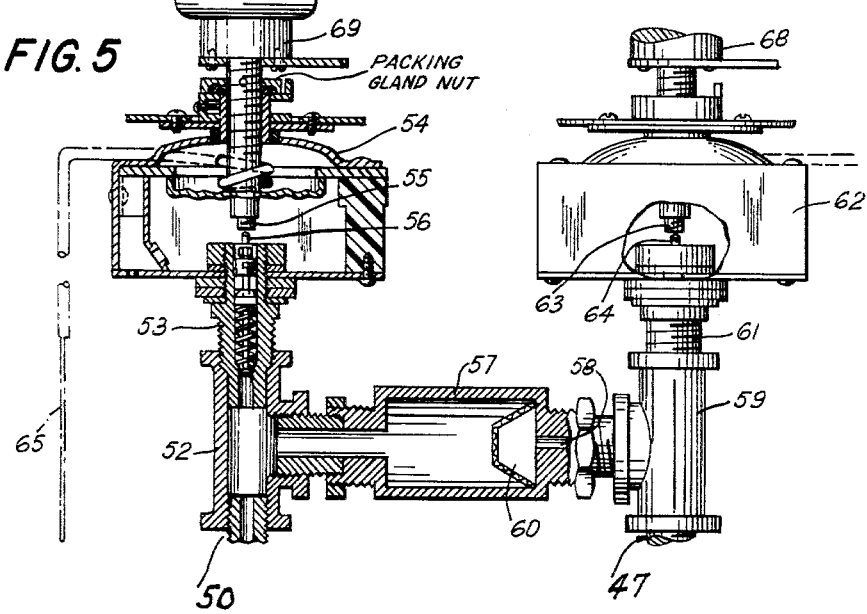

United States Patent Office
3,252,655
Patented May 24, 1966

3,252,655
TEMPERATURE CONTROL SYSTEMS
Paul Wollner, North Bergen, and Richard H. Walter, Jr., Ramsey, N.J., assignors to Aeroil Products Company, Inc., South Hackensack, N.J., a corporation of New Jersey
Original application June 27, 1960, Ser. No. 38,884, now Patent No. 3,099,392, dated July 30, 1963. Divided and this application June 29, 1962, Ser. No. 206,274
1 Claim. (Cl. 236—21)

This application is a division of applicant's application Serial No. 38,884, June 27, 1960, on which Letters Patent No. 3,099,392 issued July 30, 1963, and the invention has particular reference to a system for supplying hydro-carbon fuel to the burner of heating equipment for melting bituminous material and the like.

An object of the invention is to provide a system for automatically controlling the flow of hydrocarbon fuel to a burner of a heating apparatus for melting bituminous material and the like in accordance with the temperature required for heating the material and which material must not be heated to the flash point thereof.

Still another object of the invention is to provide a temperature control system for regulating the flow of fuel through a flow control valve arranged in the fuel supply line and having the pressure of the fuel on one side of the diaphragm thereof and air or gas at the pressure of the fuel in the fuel supply line on the other side thereof.

Still another object of the invention is to provide means for reducing the pressure of the air or gas on the diaphragm of the flow control valve upon increase of temperature in the material being heated beyond a predetermined limit and to reduce the pressure of the fuel below that required for the flow thereof in the event the material being heated approaches the flash point thereof.

Still another object of the invention is to provide a system of said character in which liquid hydrocarbon fuel such as kerosene, diesel oil and propane gas may be employed.

Another object of the invention is to provide a fuel control system for portable heating apparatus for use where electric current is not available or can only be obtained by use of storage batteries.

Another object of the invention is to provide a fuel control system which is rugged and will withstand shocks of transportation, is easy to operate and install and requires a minimum of maintenance.

With the foregoing and other objects in view, reference is now made to the following specification and accompanying drawings in which the preferred embodiments of the invention are illustrated.

In the drawings:

FIG. 3 is a schematic view of a temperature control system embodying the invention.

FIG. 5 is a view partially in section through the thermostats and air vent valves arranged in the system.

Figure 1:
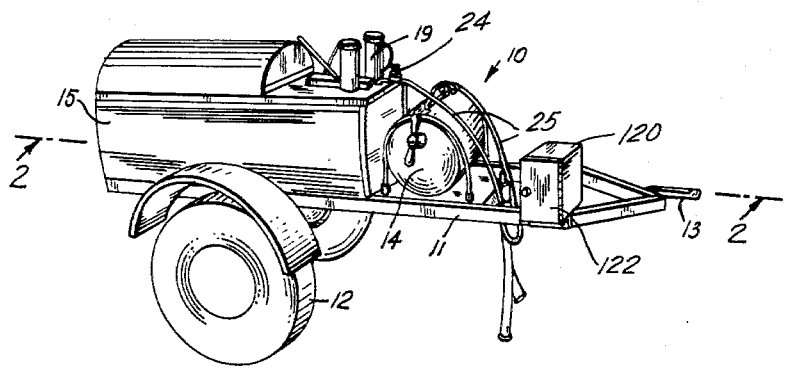
FIG. 1 is a perspective view of a portable heating apparatus for heating bituminous material and the like having a temperature control system embodied in the invention for regulating the flow of fuel to the burner of the apparatus.
Figure 2:
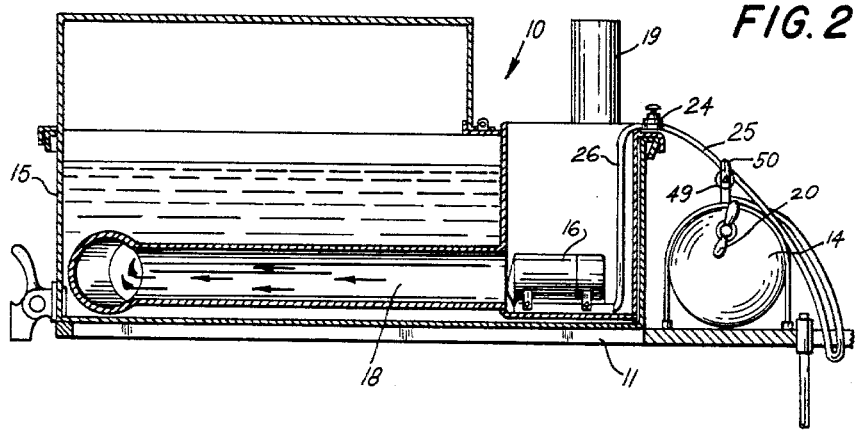
FIG. 2 is an enlarged fragmentary section through the apparatus.
Figure 4:
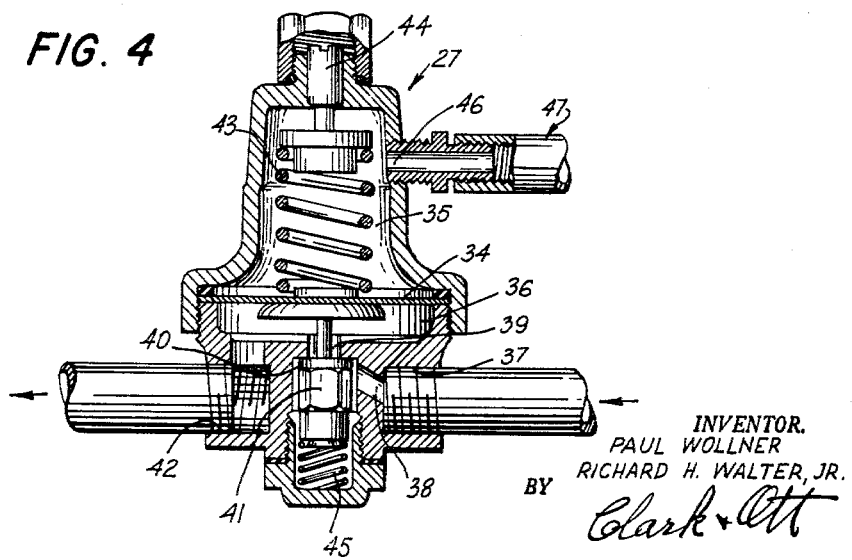
FIG. 4 is an enlarged sectional view through the flow control valve arranged in said system.

The temperature control system is illustrated in its application to a portable heating apparatus for heating bituminous material and the like for surfacing roads, roofing and the like and in such apparatus the material is heated by a torch burner connected with a fuel tank which is pressurized by any desired means.

Torch burners of this type are preheated and when this takes place the fuel line to the burner is opened and the supply of fuel is thereafter automatically controlled in accordance with the present invention.

In the application of the invention shown in the drawings, the temperature controls and the operative parts of the system are mounted on a portable heating apparatus 10 for melting bituminous material such as asphalt, pitch, tar, wax, road oils and the like. The apparatus includes a frame 11 supported on wheels 12 and with a forwardly directed tongue 13 for attaching the apparatus to a motor vehicle. A fuel supply tank 14 is supported by the frame forwardly of the receptacle 15 in which the bituminous material is melted. The material is heated by a torch burner 16 arranged so as to project a flame longitudinally of a flue 18 which is immersed in the material being heated and is connected with upwardly extending flue stacks 19 for exhausting the gases of combustion.

The fuel tank in this type of apparatus is pressurized by a hand pump 20 projecting from one end thereof and the tank is filled through a filling neck 21 adapted to be closed by a cap 22. The torch burner 16 is connected with the tank by means of a fuel supply line having a hand operated valve 24 interposed therein between a flexible hose section 25 and a pipe section 26 which is rigidly connected with the torch burner and serves as a handle therefor. Also arranged in the fuel line is a flow control valve 27 on the inlet side of which is a pressure valve 28 mounted on the upper end of a pipe 29 extending downwardly in the supply tank 14 with the open lower end 30 located adjacent the bottom thereof. On the outlet side of the flow control valve and between the same and the flexible hose section 25 is a pressure guage 31 with a dial for visually reading the pressure on the outlet side of the control valve.

The flow control valve 27 is of standard construction and includes a diaphragm 34 which divides the valve into upper and lower chambers 35 and 36, the lower chamber being in communication with the inlet 37 through the passageways 38 and 39, the latter passageway having a seat 40 for a valve member 41 which is adapted to close off the flow from the inlet. The lower chamber is also in communication with the outlet 42. The diaphragm is biased against the pressure of the fuel on the under side thereof by a coil spring 43 which may be adjusted by means of a set screw 44 and the diaphragm is biased against the spring 43 by a coil spring 45 which also biases the valve member 41 toward its seat 40. The pressure of the spring 43 is preset by the set screw 44 to the minimum pressure at which the torch burner will burn efficiently. The upper chamber is provided with an inlet 46 which is connected by a conduit 47 with the top of the fuel tank for admitting air from above the fuel under the pressure thereof in the fuel tank to the upper chamber 35 which is exerted against the diaphragm.

A fitting 48 is connected with the top of the tank for admitting air from above the top of the fuel. The fitting 48 has a safety valve 49 in the top thereof and from said fitting a conduit 50 is connected with a T fitting 52 and with an air vent valve 53 interposed between said fitting and a thermostat 54 with the actuating pin 55 thereof arranged to engage the valve element 56 of said air vent valve 53 for controlling the venting of air through said valve. A pipe coupling 57 having a relatively small orifice 58 is connected with a T fitting 59 connected with the conduit 47 and which pipe coupling 57 has a strainer 60 covering the orifice 58 so as to prevent impurities clogging the same. An air vent valve 61 is connected with said fitting 59 and with a thermostat 62 with the actuating pin 63 thereof arranged to engage the valve element 64 of said valve 61 for controlling the venting of air through said valve. Heat sensitive elements 65 and 66 are connected with the bellows of the thermostats 54 and 62 respectively, each having an expansive medium therein adapted to control the movement of said actuating pin. The heat sensitive elements 65 and 66 are located within the receptacle 15 at sensitive locations in the material being heated.

Thus the fitting 48 is connected by said conduit 50, T fitting 52, coupling 57, T fitting 59 conduit 47 with the flow control valve 27. This provides for a flow of the air from above the fuel in the tank to the flow control valve 27 and against the diaphragm 34 in the chamber 35 thereof. The control valve 27 being connected by the pipe 29 pressure gage 31 and the flexible pipe 25 provides for a flow of the liquid fuel to the torch burner. The liquid fuel passing through the control valve 27 is exerted against the underside of the diaphragm 34 while the air from above the tank is exerted against the upper side thereof as described.

The thermostat 62 is an operating thermostat and is set by adjusting the control knob 68 thereof at the desired operating temperature for melting the material in the apparatus. The thermostat 54 is a safety thermostat and is set by adjusting the control knob 69 at the maximum temperature permissible for safe operation in the melting of the material and which temperature must be below the flash point thereof. It will be understood that when the temperature in the material being heated reaches the temperature set on the operating thermostat 62, the thermostat will function to open the air vent valve 61 so as to reduce the pressure in the upper chamber 35 of the flow control valve 27 and thereby reduce the pressure on the upper side of the diaphragm. This will result in movement of the valve member 41 toward its seat 40 to thereby reduce the flow of fuel to the torch burner. If the temperature in the material being heated continues to increase to the temperature set on the safety thermostat 54, the thermostat will function to open the air vent valve 53 so as to rapidly exhaust the air from the fuel tank 14 whereby the pressure valve 28 will automatically close and interrupt the flow of fuel from the tank to the torch burner which will be extinguished. The venting of air through the air vent valve 61 as aforesaid, reduces the pressure in the conduits 47 and 50. The small amount of air vented will reduce the pressure on the diaphragm of the flow control valve 27 so as to reduce the flow of the fuel to the burner. However, the air vented through the air vent valve 61 is not sufficient to reduce the pressure in the tank 14 below the operating pressure so that it is not necessary to replace the escaped air in the fuel tank for the proper operation of the burner at the reduced pressure.

It will be understood that the pressure of the air in the upper chamber 35 of the flow control valve 27 will be substantially the same as the pressure of the fuel in the supply tank 14 while the pressure of the fuel at the inlet end 37 of the control valve will also be substantially the pressure of the fuel in the tank. The pressure of the air in the chamber 35 and on the upper face of the diaphragm 34 will be greater than the pressure of the fuel in the chamber 36 and on the under face of the diaphragm of the control valve since there is a drop in pressure in the fuel passing therethrough.

It will be understood that the pressure of the gas in the chamber 35 of the flow control valve 27 is the same as the pressure of the liquid fuel at the inlet end 37 of said valve when the air vent valves 53 and 61 are closed.

It will be understood that the air is admitted to the flow control valve 27 from the tank 14 for controlling the operation of the said flow control valve 27.

The thermostats 54 and 62 together with the air vent valves and T fittings connected therewith may be supported on the frame 11 of the heating apparatus 10 in any desired manner. As illustrated in FIG. 1 of the drawings, a cabinet 120 is supported on one side of the frame 11 in which is arranged a panel 121 shown in broken outline in FIG. 3 on which the thermostats 54 and 62 together with the parts connected therewith are mounted for convenient access thereto at the side of the apparatus by swinging the door 122 into open relation. The conduit 47 and branch conduit 50 together with the heat sensitive elements 65 and 66 protrude from the cabinet 120 which are not shown in FIG. 1 of the drawings for the sake of clarity.

While the preferred forms of the invention are shown and described herein, it is to be understood that the invention is not so limited but shall cover and include any and all modifications thereof which fall within the purview of the invention.

What is claimed is:

In a control system for controlling the flow of liquid fuel to the burner of an apparatus for heating material, said system including a receptacle for containing liquid fuel and a gas under pressure, a fuel supply line connected with said receptacle at a point below the level of fuel therein, a flow control valve interposed in said supply line having a diaphragm and a valve element in operative engagement with said diaphragm on one side thereof for controlling the flow of liquid fuel through said flow control valve and which valve element is normally biased into closed relation, a pipe line connected with said flow control valve on the side of said diaphragm opposite said valve element and connected with said receptacle above the level of the fuel therein providing a flow of gas in said pipe line from the receptacle under the pressure of the fuel therein against the diaphragm in opposition to said bias and in opposition to the pressure of the fuel in said flow control valve against said diaphragm to thereby maintain said valve element in open relation for the flow of the liquid fuel through said flow control valve, a first valve means arranged in said pipe line, a first thermostatic means having a control element adapted to be subject to the heat of the material being heated in said apparatus and having a reciprocatory element movable in response to change of temperature of said control element and disposed to actuate said valve means to partly bleed the gas from said pipe line in the event that the temperature of said control element reaches a predetermined high value on said thermostatic means to thereby reduce the pressure of the gas against said diaphragm whereby said valve element of the flow control valve is moved by its bias toward closed relation to reduce the flow of the fuel in said fuel supply line, a second valve means arranged in said pipe line, and a second thermostatic means having a control element subject to the heat of the material being heated in said apparatus and disposed to actuate said second valve means to bleed all the gas from said pipe line in the event that the temperature of said control element of said second thermostatic means reaches a predetermined temperature setting permissible for heating the material in the apparatus to thereby eliminate the pressure of the gas against said diaphragm whereby said valve element of the flow control valve is moved by its bias to closed relation to shut off the flow of the fuel in said fuel supply line.

References Cited by the Examiner

UNITED STATES PATENTS

| | | | |
|---|---|---|---|
| 1,409,678 | 3/1922 | Dayton | 158—36.5 |
| 1,699,407 | 1/1929 | Reid | 36.5 |
| 2,372,564 | 3/1945 | Engholdt | 236—80 |
| 2,645,906 | 7/1953 | Ryan. | |

OTHER REFERENCES

Catalog 4051, published March 1941, by The Bristol Company, Waterbury 91, Conn. (Page 6 relied on.)

Bulletin TA104, published February 1943, by The Bristol Company, Waterbury 91, Conn. (Page 6 relied on.)

EDWARD J. MICHAEL, *Primary Examiner.*

D. G. BLACKHURST, *Examiner.*